United States Patent [19]
Goto

[11] Patent Number: 5,903,786
[45] Date of Patent: May 11, 1999

[54] FUNCTION SETTING DEVICE FOR PHOTOGRAPHIC DEVICE

[75] Inventor: Tetsuro Goto, Funabashi, Japan

[73] Assignee: Nikon Corporation, Tokyo, Japan

[21] Appl. No.: 08/877,506

[22] Filed: Jun. 17, 1997

Related U.S. Application Data

[60] Provisional application No. 60/037,946, Feb. 20, 1997.

[30] Foreign Application Priority Data

Jun. 17, 1996 [JP] Japan ..................................... 8-155313

[51] Int. Cl.$^6$ .................................................. G03B 17/00
[52] U.S. Cl. ........................... 396/297; 396/299; 396/242; 396/243
[58] Field of Search ..................... 396/297, 299, 396/242, 243

[56] References Cited

U.S. PATENT DOCUMENTS

| | | | |
|---|---|---|---|
| 4,699,492 | 10/1987 | Iwashita et al. | 396/299 |
| 4,710,008 | 12/1987 | Tosaka et al. | 396/299 |
| 4,763,195 | 8/1988 | Tults | 358/193.1 |
| 5,416,556 | 5/1995 | Suzuki et al. | 396/89 |

*Primary Examiner*—Russell Adams

[57] ABSTRACT

A multi-function and high function photographic device having optional setting of only those functions desired by the photographer, thereby omitting complicated setting operations, such as the selection of unnecessary function mode settings or function ranges. The photographic device includes an LCD to display plural function operation elements which are operational modes relating to photography or numerical values indicating operation ranges relating to photography. The photographic device further includes a manual operation device to select optional elements from among the function operation elements which are displayed on the LCD. A control device inhibits operation of the optional elements which were selected by the manual operation device. Moreover, control device controls display or non-display of function operation elements on the LCD, to indicate operation or operation inhibition states.

18 Claims, 9 Drawing Sheets

FUNCTION SETTING DEVICE FOR PHOTOGRAPHIC DEVICE

CROSS REFERENCE TO RELATED APPLICATIONS

This application is based upon and claims priority from Japanese Patent Application No. 8-155313 filed Jun. 17, 1996, the contents of which are incorporated herein by reference. This application also claims the benefit of the provisional U.S. application filed Feb. 20, 1997 entitled A FUNCTION SETTING DEVICE OF IMAGE PICKUP DEVICE having a Ser. No. 60/037,946.

BACKGROUND OF THE INVENTION

1. Field of the Invention

The present invention relates to a function setting device for a photographic device, such as a camera or the like, which can optionally set functions related to various photographic operations or which can optionally set functions related to various kinds of photographic modes, such as an exposure mode.

2. Description of the Related Art

Cameras are known which have a high degree of functionalization made possible by digital control. More particularly, cameras are known which can perform a variety of functions with a CPU based control system disposed in the camera. Furthermore, the known cameras include a plurality of operating buttons, or the like setting means, to set the various functions, and a display, such as an LCD, to display functions related to photographic operations. For example, in a conventional camera having an exposure mode function, selection of an exposure mode is possible from among at least four modes: program; shutter priority; aperture priority; and manual. In addition to the exposure mode function, similar multi-functionalization in cameras exists for various kinds of function setting modes, such as shutter speed, aperture, selection range of exposure correction, photometric mode, rangefinding mode, windup mode, strobe control mode, and the like.

However, the circumstances of camera use differ greatly among photographers. More particularly, regardless of whether the user is a professional photographer or an amateur photographer, there exist photographers in various kinds of photographic genres, and the functions which are necessary in each of the respective genres vary greatly in their details. For example, with respect to a professional photographer, the functions used in photography may be very limited because many professional photographers work only in a specific photographic genre. However, within the limited range of functions used by a professional photographer, it is desirable to be able to very rapidly change the function content.

If the commercial cost of the camera is not a factor to be considered, it would be ideal to provide a camera whose functions completely correspond to a particular genre. However, in practice, the cost of a camera having this type of feature becomes high. Accordingly, when the consumer actually considers a camera having a large number of functions, and selects desired functions from among the large number of functions, the consumer himself provides a camera having functions corresponding to the circumstances of use for his particular genre.

The conventional cameras, as described above, are designed with multi-functionalization and high functionalization. Nonetheless, these cameras provide numerous functions which are unnecessary for certain photographers because only specific modes of operation are necessary according to the circumstances characteristic of photography in each kind of photographic genre. For example, even if only the shutter priority mode and the manual mode are necessary in the exposure mode, rapid selection of the exposure mode cannot be performed because superfluous program mode and aperture priority mode appear on the display at the time of selecting the exposure mode. Moreover, in selecting a shutter speed mode, even if the normal region from 1/1,000 to 1/60 is sufficient, rapid selection cannot be performed because a range of from 1/8,000 to 1 second is displayed, and it is necessary to select a shutter speed from among the values in this range.

Accordingly, in conventional cameras which are designed for multi-functionalization and high functionalization, problems occur in that it is necessary for individual photographers to perform the setting of unnecessary function modes, or the selection of unnecessary function ranges, and to change the selection of the function mode settings and the function ranges. Further, the operations of setting the function modes and selecting the function ranges are complicated operations, and take excessive amounts of time.

SUMMARY OF THE INVENTION

It is an object of the present invention to overcome the above-noted problems of the prior art, and to provide a photographic device having advanced multi-functionality and high functionalization, while eliminating complicated operations of the setting of unnecessary functions or the selecting of unnecessary function ranges.

It is another object of the present invention to provide a photographic device having a function setting device which allows a photographer to optionally set only those functions which are necessary to meet the photographer's requirements.

Additional objects and advantages of the invention will be set forth in part in the description which follows, and, in part, will be obvious from the description, or may be learned by practice of the invention.

Objects and advantages of the present invention are achieved with a function setting device for a photographic device including plural function operation elements, a manual operating device to select a function operation element from among the plural function operation elements, and a control device to inhibit the operation of the function operation element optionally selected from among the plurality of function operation elements by the manual operating device.

Moreover, the function setting device in accordance with the present invention includes a function setting display device to display plural function operation requirements. The display device is capable of displaying operation states or operation inhibition states by changing the display of the function operation requirements in the display device with the manual operating device.

In accordance with the embodiments of the present invention, a function operation element may be, for example, an exposure mode, shutter speed mode, aperture mode, photometry mode, rangefinding mode, winding mode, and strobe mode, or other function setting modes related to photography or numerical values representing operating ranges related to photography. The manual operating device may comprise a mode setting dial, up and down buttons, command dials, and an erase button. The control device may comprise a control circuit within the camera which includes a CPU. The display device may be, for example, an LCD, but is not limited to an LCD.

In accordance with embodiments of the present invention, a photographer can optionally set only those modes of operation of a function which are necessary to the photographer, and the photographer can optionally select only those function ranges which are required by the photographer. Further, in accordance with embodiments of the present invention, function setting modes which are not required do not appear on the display device. Still further, numerical values which are in an unnecessarily wide range of possible selection of functions do not appear on the display device. Furthermore, when changing the content of the function setting display, setting changes can be performed by rapid operations, and with excellent responsiveness.

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Reference will now be made in detail to the preferred embodiments of the present invention, examples of which are illustrated in the accompanying drawings wherein like reference numerals refer to the same or similar elements throughout.

Embodiments of the present invention will be described below first with reference to FIGS. 1–3 which show a function setting device for a photographic device in accordance with the present invention. In accordance with embodiments of the invention described herein below, the photographic device is preferably a digital still camera. However, the photographic device is not limited to a still camera and various other types of imaging devices, such as video recorders, may be used with the present invention.

Figure 1:
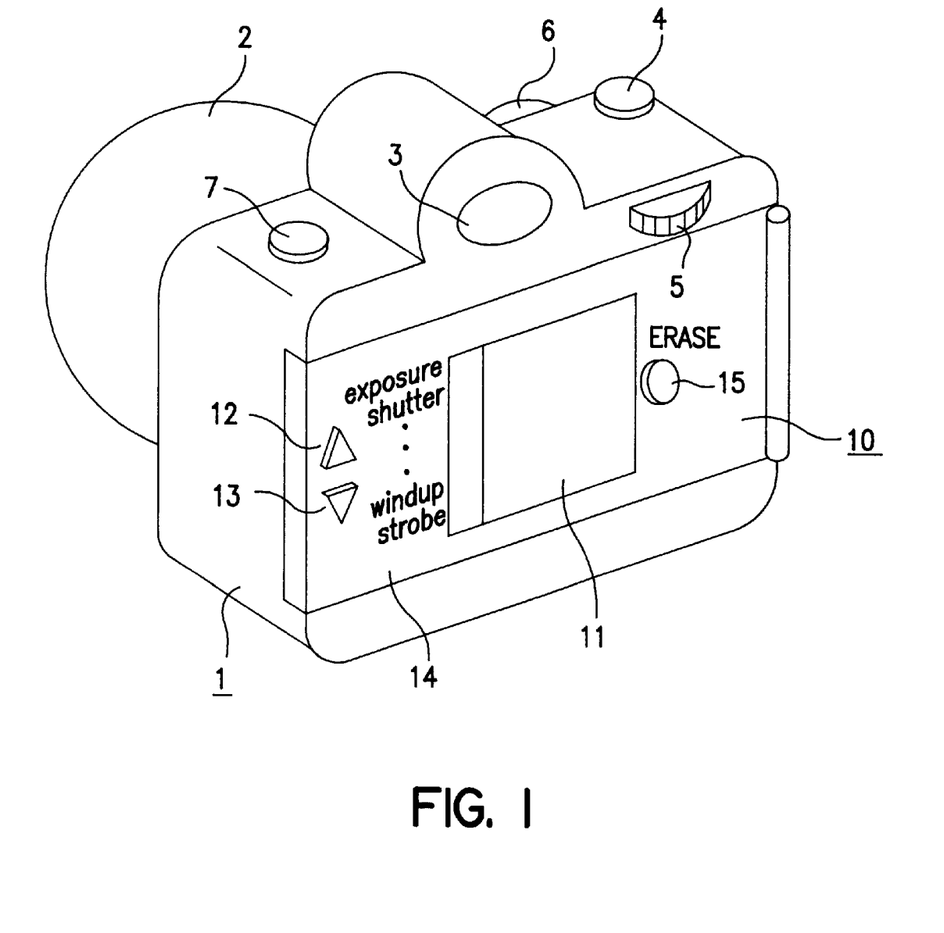
FIG. 1 is an oblique diagram showing the external appearance of a camera having a function setting device in accordance with embodiments of the present invention.

As shown in FIG. 1, the photographic device is a camera comprising a camera body 1 including a lens barrel 2 mounted in the center of a front surface of the camera body 1, through which a subject image passes to a viewfinder optical system (not shown in the drawing) within the camera body 1. The subject image is visible by looking into a viewfinder 3 located at a top portion of the back surface of the camera body 1. A large liquid crystal display (LCD) 11 is disposed on a back cover 10 of the camera body 1 to display functional modes of operation which are set, exposure conditions and the like. A shutter mechanism (not shown in the drawing) is operated by an operation of depressing a shutter button 4 to perform an exposure.

Two command dials 5, 6 are located in the back surface and the front surface, respectively, of the camera body 1. The command dial 6 projects in the fore direction and the command dial 5 projects in the aft direction of the camera body 1.

A mode setting dial 7, is disposed at one side of the top of the camera body 1, and operates to set a function elimination mode, and to change a function setting to an initial value. As shown in FIG. 2, which is a diagram of the mode setting dial 7 and of an index display portion set around the circumference of the mode setting dial 7, the mode setting dial 7 is settable to three positions which are indicated by an arrow-shaped indicator. Specifically, the mode setting dial 7 includes a normal position (USE) 20, which is a setting position when actually operating the camera to perform photography; an erase position (ERASE) 21, which is a setting position to place the camera in a state wherein it becomes possible to erase unnecessary functions within each mode setting, or to curtail unnecessarily wide setting ranges; and, a reset position (RESET) 22, which is a setting position to place the camera in a state in which modes which were erased or the ranges which were reduced are returned to an initial state (e.g., the state at the time of factory shipping).

Further, the various functional modes 14 are displayed in the back cover 10 at a side of and next to the LCD 11. Furthermore, an up button 12, a down button 13 and an erase button 15 are arranged at the sides of the LCD 11. The functions of the up button 12, the down button 13, and the erase button 15 will be described in detail hereinbelow.

The operation of the camera shown in FIG. 1 will now be described below. When the mode setting dial 7 is set in the normal use position USE 20 (FIG. 2), the camera is in a condition in which photography can be performed. When the command dial 5 or the command dial 6 is then independently operated, it is possible to change the respective shutter speed and aperture values. Moreover, when the command dial 5 is rotated while operating either the up button 12 or the down button 13, for example, the exposure mode, photometry mode, and the like commence, and the settings of other condition data can be changed.

The command dial 5 can be easily operated with the thumb of the right hand, and the command dial 6 can be easily operated with the forefinger of the right hand while viewing the LCD 11 for all operations, or while viewing an LCD display (not shown in the drawing) disposed within the viewfinder 3.

When the mode setting dial 7 is set in the erase position ERASE 21 (FIG. 2), elimination of unnecessary function settings or the curtailing of unnecessary function setting ranges becomes possible. When the mode setting dial 7 is in the erase position ERASE 21, the up and down buttons 12, 13 can be used to select a mode which is to be erased. The selected mode can be erased by depressing the erasure button 15. Functions in the erased state can be returned to the original state (e.g., the initial state at the time of factory shipping) by setting the mode setting dial 7 to the reset position RESET 22 (FIG. 2). The structure and circuity of the operating members 5, 6, 7, 12, 13 and 15 are well known, and a detailed description of the structure and circuitry of operating members 5, 6, 7, 12, 13 and 15 will not be provided.

The operations of erasing various modes and returning the camera functions to the initial state using operating members 5, 6, 7, 12, 13 and 15 will now be described in detail below.

The display, operation elements and manual operating device on the back cover 10 of the camera body 1 will now be described with reference to FIG. 3. FIG. 3 is a detailed diagram of the LCD 11 display device and of an operation unit and a display unit surrounding the LCD 11. As shown in FIG. 3, the names of the various different camera functions 14 are displayed in characters at the side of the LCD 11. The display configuration of the various functions, from the upper side to the lower side, comprises a display of exposure mode, shutter speed, aperture value, photometric mode, rangefinding mode, windup mode, and strobe mode. As shown in FIG. 3, in display segment 26, the LCD 11 displays the various modes of operation associated with the respective functions and the various ranges associated with the respective functions. The entire display contents of each function is shown in FIG. 3. Further, the LCD 11 includes elliptical segments 25 which display whether respective modes are selected.

Figure 3:
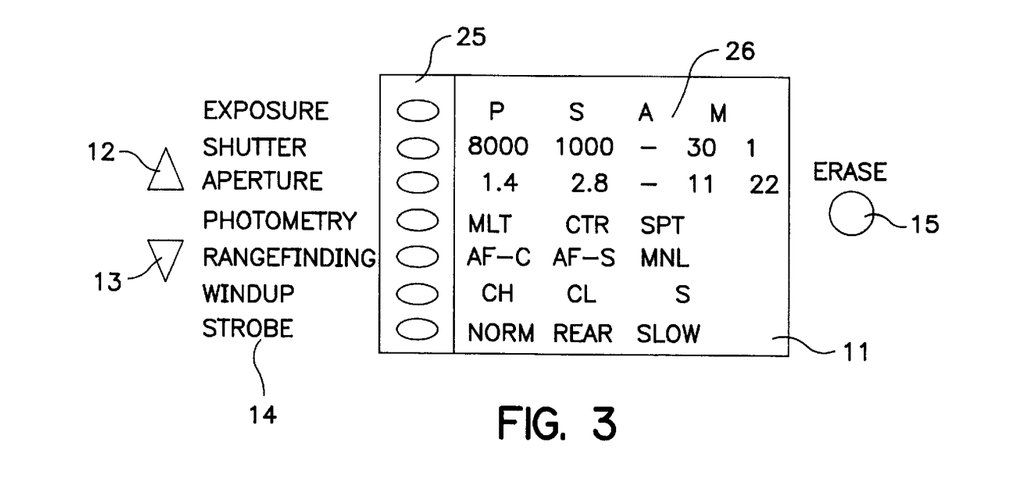
FIG. 3 is a diagram showing an operation portion and a display disposed in a back surface of the camera in accordance with embodiments of the present invention.

For example, as shown in FIG. 3, there are four modes of operation which can be set in the exposure function; the four modes are P (program), S (shutter priority), A (aperture priority), and M (manual). Moreover, in connection with shutter speed function, the highest shutter speed which can be set is either 1/8,000 or 1/1,000, and the lowest shutter speed which can be set is either 1/30 or 1 second. Similarly, in connection with the aperture value function, the highest value is F1.4 or F2.8, the lowest value is F11 or F22, and a possibility of selecting either is displayed. Further, in connection with the photometry function, the three modes of operation MLT (multi-division photometry), CTR (central emphasis photometry), and SPT (spot photometry) are available. In connection with the rangefinding function, the three modes of operation AF-C (continuous AF), AF-S (one-shot AF), and MNL (manual) are available. In connection with the windup function, the three modes of operation CH (high speed continuous windup), CL (low speed continuous windup), and S (one-frame windup) are available. Furthermore, in connection with the strobe function, the three modes of operation NORM (normal synchro), REAR (rear blind synchro), and SLOW (low speed synchro) are available. In each of the various functions, all of the modes of operation can be selected or only some of the modes of operation can be selected.

As will be described hereinbelow, in accordance with embodiments of the present invention, within the various functions specific modes of operation can be selected while others can be erased. For example, in the exposure function, the P and A modes can be erased while the S and M modes remain. Further, for example, in the shutter speed function, selection of a shutter speed range of 1/1,000 and 1/30 can be performed.

Figure 4:
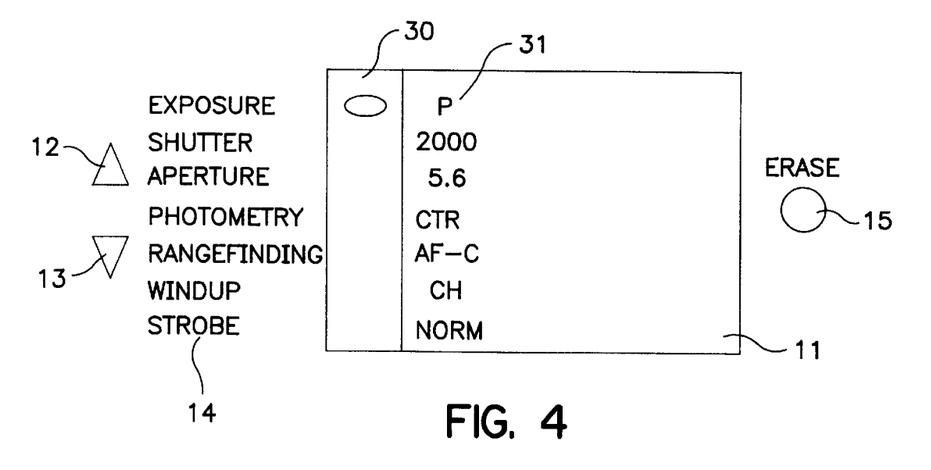
FIG. 4 is a diagram showing a state of the display when the mode setting dial is in a normal use position in accordance with embodiments of the present invention.
Figure 5:
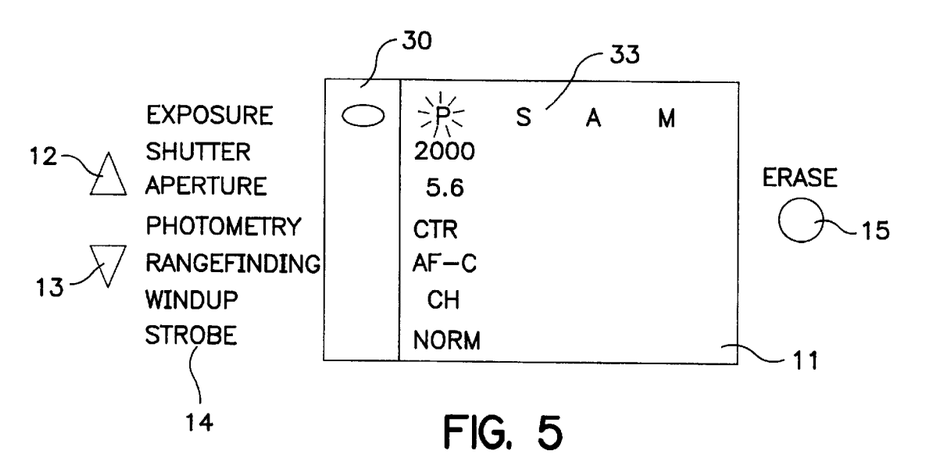
FIG. 5 is a diagram showing a state of the display when performing a change of the exposure mode in accordance with embodiments of the present invention.
Figure 6:
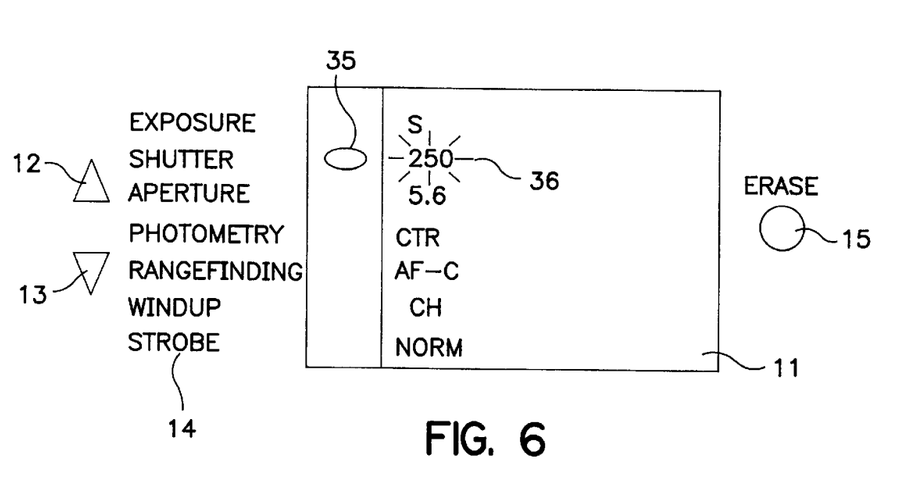
FIG. 6 is a diagram showing a state of the display after the change of the exposure mode shown in FIG. 5 has been performed in accordance with embodiments of the present invention.

FIGS. 4–6 are examples of displays when the mode setting dial 7 is set in the normal position USE 20. As shown in FIG. 4, the elliptical segment 30 to the side of the exposure function is lighted, and, as displayed in plural segments 31 on the right-hand side of the elliptical segment 30, the combination of modes is set as follows: program, 1/2,000, F5.6, central emphasis photometry, continuous AF, high speed continuous windup, and normal synchro.

FIG. 5 is an example of a display when the exposure function changes from the state in FIG. 4. In the example shown in FIG. 5, the elliptical segment 30 corresponding to the exposure function is lit as in FIG. 4. When the command dial 5 is rotated, all of the modes of operation in the exposure function which it is possible to select (program, shutter priority, aperture priority, and manual) are displayed in segment 33. Then, the first segment P (program) among the exposure mode segments flashes. When the display 11 is in this state and the command dial 5 is rotated, the flashing segment moves either to the left or right depending on the direction of rotation of the command dial 5. After the desired mode of operation display segment is set in the flashing state, when the shutter button 4 is operated to a half-depressed state, the flashing segment resets to the lighted state, and an altered mode of operation is thereby set.

FIG. 6 is an example of a display when, after the exposure function has been changed to the shutter priority mode (S) in FIG. 5, a separate operational mode is changed. When the down button 13 is depressed with the camera in the state indicated by the display of FIG. 5, the elliptical segment 35 moves downward to the position shown in FIG. 6. The display 11 then begins flashing of the shutter speed value 36 which is presently set. When the command dial 5 is rotated with the display 11 in this state, the shutter speed value changes. When the desired numerical value of shutter speed has been reached, and the shutter button 4 is operated to a half-depressed state, the desired numerical value of shutter speed lights up showing that the shutter speed has changed.

Moreover, a particularly rapid change of shutter speed and aperture value are necessary. Therefore, it is more convenient to be able to directly change shutter speed and aperture value by operation of the command dials 5, 6 without specifying the up and down buttons 12, 13.

Figure 7:
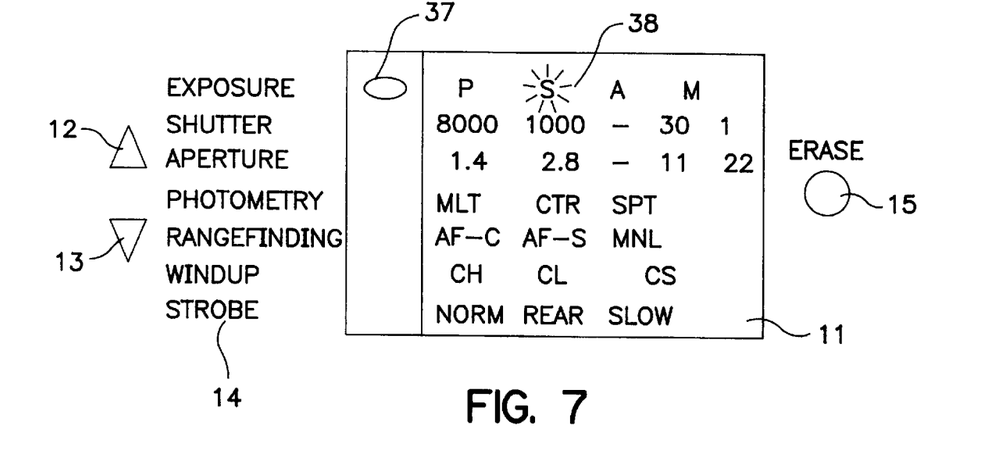
FIG. 7 is a diagram showing a state of the display when the mode setting dial is in an erase position in accordance with embodiments of the present invention.
Figure 8:
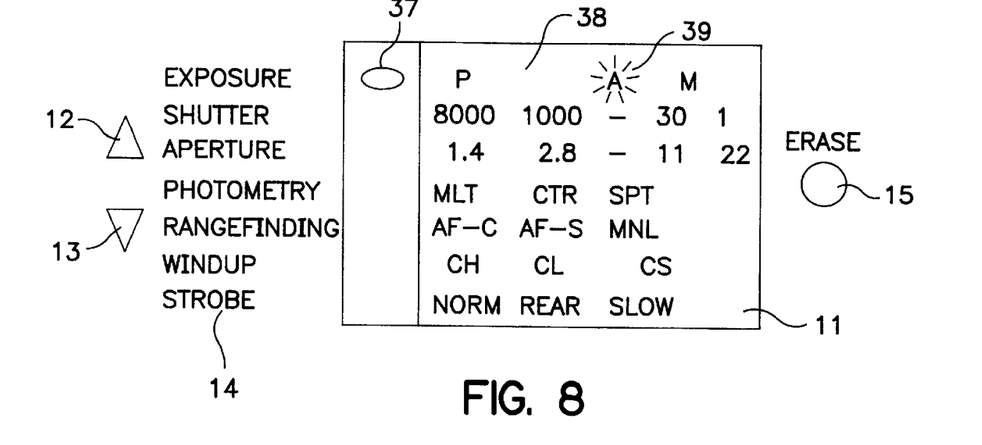
FIG. 8 is a diagram showing a state of the display when the erase button has been depressed when the display is in the state shown in FIG. 7 in accordance with embodiments of the present invention.
Figure 9:
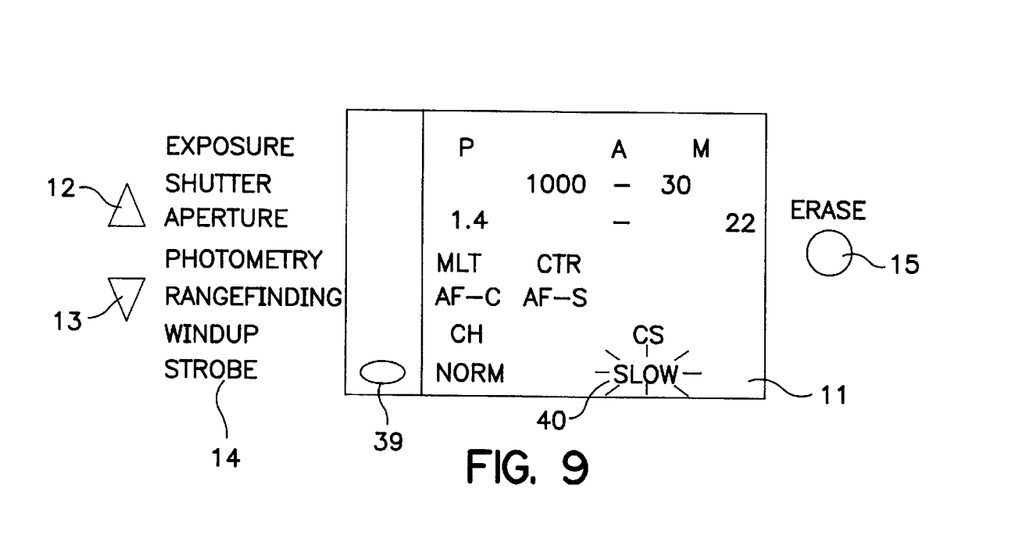
FIG. 9 is a diagram showing a state of the display after the set functions have been restricted in accordance with embodiments of the present invention.

FIGS. 7–9 are examples of the display 11 when the mode setting dial 7 is set to the erase position (ERASE) 21. More particularly, FIGS. 7–9 illustrate the various modes of operation within each function, and the erasure of unnecessary modes of operation or the curtailing of unnecessarily wide setting ranges within each function.

FIG. 7 is an example of a display in the case in which the mode setting dial 7 has been set in the erase position ERASE 21 for the first time after factory shipment. With the mode setting dial 7 in the erase position ERASE 21, when the up button 12 or the down button 13 is depressed, the elliptical segment 37 moves such that it is aligned with the row of the display which is the subject of a functional mode setting which it is desired to erase. Furthermore, upon rotating the command dial 5, the flashing segment 38 is moved to the subject mode of operation which is desired to be erased. In accordance with the embodiment shown in FIG. 7, an example is shown in which it is desired to erase the shutter priority mode (S).

FIG. 8 is an example of a display after a subject mode for erasure as been specified as in FIG. 7, and the erase button 15 has been depressed. Specifically, the flashing segment 38 (FIG. 7) which indicates the shutter priority (S) exposure mode is extinguished, and the next segment A39 starts flashing.

In each of the shutter speed mode and aperture value mode, limitation of the range is performed by erasing any of the plural prepared highest numerical value or lowest numerical value.

As described above, by depressing the up button 12 or the down button 13, the elliptical segment 37 can be moved in the above-described manner to the subject mode of operation which is desired to be erased. Furthermore, by rotating the command dial 5, the flashing segment 38 is moved to the subject mode of operation which is desired to be erased. Still further, when repeating the process of depressing the erase button 15, the photographer completes the operation of setting modes which were combined in a photographic mode.

FIG. 9 shows an example of a display after the mode setting operations described above with respect to FIG. 8 have been completed. As shown in FIG. 9, an elliptical segment 39 is aligned with the strobe function, and the flashing segment 40 indicates a slow synchro strobe mode. After the mode setting operations, when the mode setting dial 7 is rotated to the normal use position USE 20, a display, such as the display of FIG. 6, is performed to display the combination of the set modes of operation and/or the limited ranges set as described above.

Figure 2:
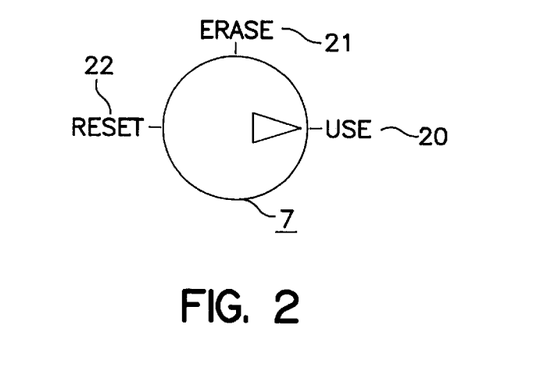
FIG. 2 is a diagram of a mode setting dial used in the camera in accordance with embodiments of the present invention.

After performing the mode setting processes illustrated in FIGS. 4–9, when it is desired to reset the contents of the mode settings, the mode setting dial 7 shown in FIG. 2 is rotated to the reset position RESET 22. The various modes indicated on the display 11 are thereby reset to the initial state with nothing erased, as shown in FIG. 7. Thereafter, by repeating the mode setting operations described above, it becomes possible to change the mode setting contents to new mode settings.

Furthermore, in the erasure process described above with reference to FIG. 8, when erasing all the segments in a function, for example, when erasing segments P, S, A and M in the exposure function, processes which conflict with the fundamental condition of the camera are inhibited. For example, in accordance with embodiments of the present invention, when P, S and A have been erased, the erasure of M, which is the final subject, cannot be performed.

Figure 10:
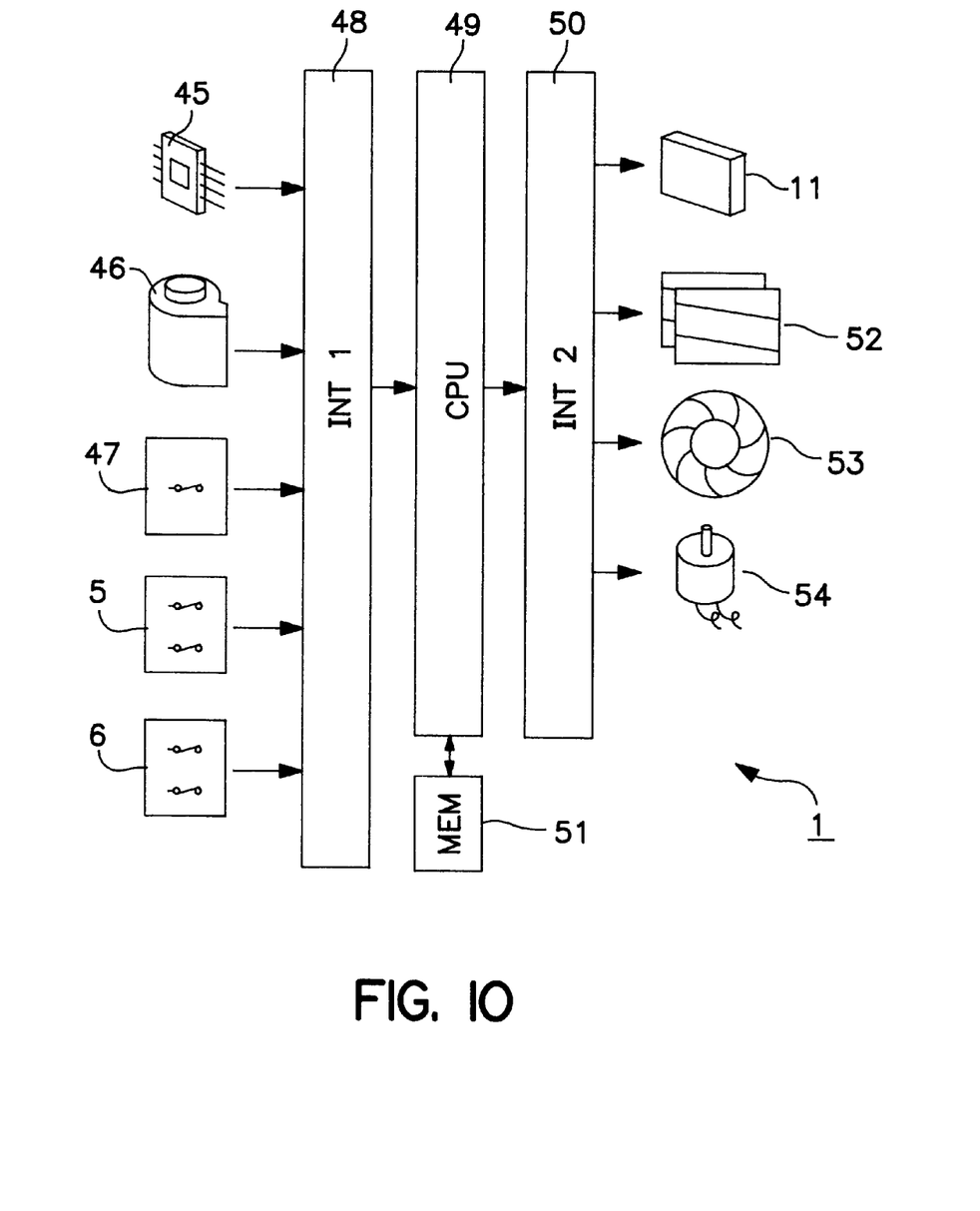
FIG. 10 is a diagram showing a control system for the function setting device in accordance with embodiments of the present invention.

FIG. 10 is a diagram of a control system of the camera shown in the FIG. 1. The control system includes a CPU 49 to control all mechanisms and circuits in the camera body 1. The CPU 49 receives input signals from various sensors, detection circuits and switches and outputs control signals to control various camera mechanisms.

Sensors 45, such as a photometric circuit or a rangefinding circuit, detect subject luminosity and range, respectively, and output signals indicating detected values to the CPU 49 via an interface circuit 48 (INT 1). A film sensitivity detection circuit 46 detects film sensitivity and outputs film sensitivity signals to the CPU 49 via the interface circuit 48. Operating signals from a switch group 47 related to the operating sequence, or from two each switches disposed within the command dials 5, 6 (i.e., the command dials each have two switches, although the command dials 5, 6 may have a third ground connection switch), are input to the CPU 49 via the interface circuit 48. Furthermore, the two each switches which comprise the command dials 5, 6 detect the amount of rotation and rotary direction of the command dials 5,6 according to a phase displacement signal by a predetermined amount of the respective ON, OFF.

The CPU 49 outputs control signals, via an interface circuit 50 (INT 2), to control the LCD 11, a shutter 52, an aperture 53, and an actuator 54. More particularly, the CPU 49 controls the display of the modes of operation on the LCD 11, the shutter speed of the shutter 52, the aperture diameter of the aperture 53, and the rotation of the actuator 54, such as an AF mode or a windup mode, to perform focusing or windup or rewinding of film.

The CPU 49 performs data communication with a memory 51 and, when the power supply is commenced, the CPU 49 reads out the previously set conditions from the memory 51. When the power supply ends, the CPU 49 performs the operation of storing in the memory 51 the most recently set operational mode conditions, set by the command dials 5, 6. Furthermore, the memory 51 also includes data representing the state of each kind of mode of operation which can be selected.

Figure 11:
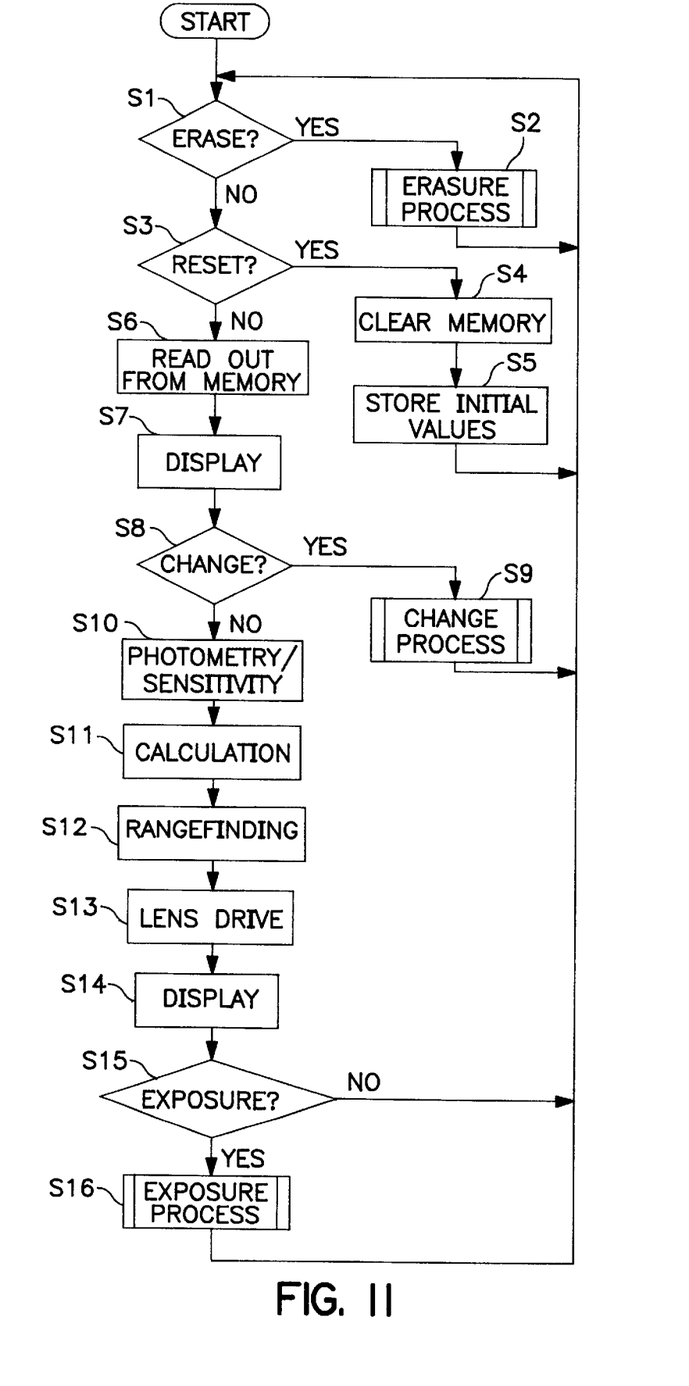
FIG. 11 is a flow chart showing an operational process for setting functions in accordance with embodiments of the present invention.

FIG. 11 is a flow chart showing an operational process for erasing, resetting and displaying modes of operation controlled by the control system shown in FIG. 10, and which is carried out repetitively while power is supplied.

Beginning in step S1, the setting of the mode setting dial 7 is confirmed, and it is determined whether or not the index position is the erase position ERASE 21. When it is confirmed that the erase position ERASE 21 is selected, the operational process proceeds to step S2, and an erasure operational process is performed, as will be described hereinbelow with reference to FIG. 12. After the erasure operational process is performed, the operational process then returns to step S1.

If the mode setting dial 7 is not set in the erase position ERASE 21 in step S1, the operational process proceeds to step S3, and it is determined whether it not the mode setting dial 7 is in the reset position RESET 22. If the reset position RESET 22 is set, the operational process proceeds to step S4, the contents of the memory 51 are erased, and, in step S5, the initial values of the memory 51 set in the factory are reset, i.e., the setting contents such as those shown in FIG. 7 are reset. The operational process then returns to step S1.

If the mode setting dial 7 is not set to the reset position RESET 22 in step S3, the operational process proceeds to step S6, and the data stored in the memory 51 is read out. Continuing, in step S7, the LCD 11 is controlled to display based on the data read from memory 51. The state of the display at this time becomes the same as that shown in FIG. 4.

Next, in step S8, it is determined whether or not a change process initiated by up, down buttons 12, 13 or the command dials 5,6 is necessary. If it is determined that a change process is necessary, then, in step S9, the processes of mode selection and change of display contents are carried out, and the operational process returns to step S1. The change process of step S9 is performed as described above with respect to the displays shown in FIGS. 5 and 6.

When it is determined that a change process is not necessary in step S8, the operational process proceeds to step S10, where a subject luminosity signal from the sensor 45 and a film sensitivity signal from the sensitivity detection circuit 46 are read out. Then, in step S11, a photometric value and sensitivity value are calculated, and suitable exposure information is determined.

Continuing, in step S12, a rangefinding signal for the subject is obtained from the sensor 45, and in step S13 the AF motor in the actuator 54 is driven, and focusing is performed by driving of the lens. Next, in step S14, the data relating to the photometry or the rangefinding are displayed on the LCD 11.

In step S15, the shutter button 4 is operated and fully depressed, and it is determined whether or not an exposure operation commences. If it is determined in step S15 that the shutter button 4 is not operated to full depression, the operational process returns to step S1 and the operational process is reiterated.

When it is determined in step S15 that an exposure operation has commenced, the operational process proceeds to step S16, the opening of the aperture 53 is set, the shutter 52 is opened for a predetermined time, and the windup motor in the actuator 54 is rotated to perform film windup. The operational process then returns to step S1, and is reiterated while power is supplied.

Figure 12:
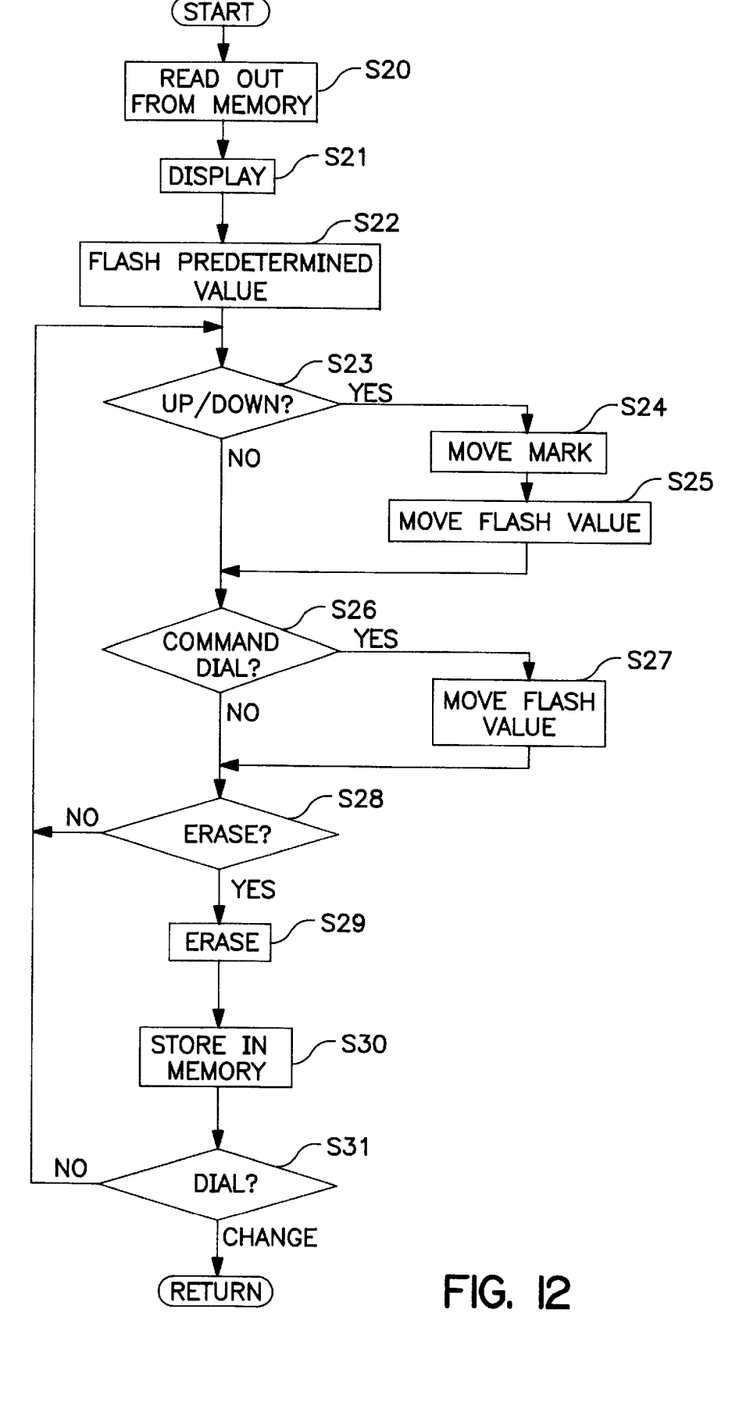
FIG. 12 is a flow chart showing an erase operational process performed in step S2 of FIG. 11 in accordance with embodiments of the present invention.

FIG. 12 is a flow chart showing the erasure operational process performed in step S2 of the flow chart of FIG. 11.

Beginning in step S20, the data stored in the memory 51 is read out, and the contents are displayed on the LCD 11 in step S21. Next, in step S22, the first segment comprising the erasure subject is caused to flash. Proceeding to step S23, it is determined whether or not the up button 12 or the down button 13 has been depressed. When it is determined that the up button 12 or the down button 13 has been depressed, the operational process proceeds to step S24. In step S24, the elliptical segment 25 which is lighted is moved up or down according to whether the up button 12 or the down button 13 is depressed. At the same time as this, in step S25, display segments which are simultaneously caused to flash are also caused to move. The operational process then proceeds to step S26.

When, in step S23, it is determined that the up button 12 or the down button 13 has not been depressed, the operational process proceeds to step S26. In step S26, it is determined whether the command dial 5 is rotated. When it is determined that the command dial is rotated, in step S27, the flashing segment is moved, as in step S25. A display such as that shown in FIG. 7 is performed by the above operations.

Next, in step S28, it is determined whether or not the erase button 15 has been depressed. If the erase button 15 has not been depressed, the operational process returns to step S23 and is reiterated. Moreover, if it is determined that the erase button 15 has been depressed, the operational process proceeds to step S29, and the flashing segment from step S27 is erased. Furthermore, the flashing segment is moved to the adjacent segment.

Continuing, in step S30, the functional mode settings which are set as a result of the above-described operational process are stored in the memory 51. Next, in step S31, it is determined whether or not the position of the mode setting dial 7 has been changed. If the position of the mode setting dial 7 has changed, the operational process shown in FIG. 12 ends, returning to step S3 of FIG. 11. Moreover, if the position of the mode setting dial 7 has not changed, the operational process returns to step S23, and the above operational process is reiterated.

The present invention is not limited to the structure which has been described hereinabove, and the structure of the photographic device may be suitably modified. Moreover, the functions which can be set are not limited to the above-described functions, the exposure mode, shutter speed, aperture value, etc. Selection of a functional mode may be made according to necessity from among plural functions.

Further, in accordance with embodiments of the present invention described above, the example of limiting modes of operation or ranges within a functional mode has been shown and described. However, the present invention is not restricted to limiting the various modes of operation within a function, and the function itself may also be completely eliminated.

Furthermore, in accordance with embodiments of the invention described above, the photographic device is preferably a still camera. However, the present invention is not limited to a still camera, and, for example, can also apply to a movie camera.

In accordance with embodiments of the present invention, in a camera body 1, such as a still camera, an LCD 11 display device is disposed in the back surface of the camera body 1. The modes of operation corresponding to each function, and the possible ranges of a function for the exposure mode, shutter speed, aperture value, photometry, rangefinding and the like are displayed on the display. While viewing the display, a particular mode of operation or range may be set, changed, erased or restored by operation of the mode setting dial 7, the up, down buttons 12, 13, the command dials 5, 6, the shutter button 4, and the erase button 15.

In accordance with the preferred embodiments of the present invention, a function setting device in a photographic device, as described hereinabove, includes plural function operation elements which correspond to functions related to photography, such as modes of operation and numerical values indicating operation ranges relating to photography; a manual operating device; and a control device to inhibit, by operation of the manual operating device, operation of optional elements selected from among the function operation elements. Thus, the present invention provides a simple construction, and confers the excellent effects described below.

In accordance with the preferred embodiments of the present invention, in photographic devices which are multi-functional or have progressed to high functionalization, complicated operations which entail the setting of unnecessary detail functions or unnecessary function ranges are eliminated, and each mode of operation which the photographer takes as necessary can be optionally set and the selection range of numerical values can be optionally set. Accordingly, a photographic device which has combined functions and ranges to the degree necessary for the photographer can be provided. In particular, because unnecessary modes of operation within a functional mode can be erased, and the desired ranges are set, adjustment of functions is performed very rapidly and simply, and there are no complications such as in the prior art.

In accordance with the preferred embodiments of the present invention, the appearance of unnecessary function setting modes, and the appearance of numerical values which are in unnecessarily wide function selection ranges, are eliminated. Further, while changing the operational mode corresponding to a function, rapid setting changes can be performed by rapid operations. As a result, the present invention is excellent from the aspect of responsiveness.

In accordance with the preferred embodiments of the present invention, by using operating devices, such as plural operation buttons and a display device, all kinds of fine genres of photography can be performed with a mass production camera having reduced cost, and a cameraman having various plans is accommodated.

In accordance with the preferred embodiments of the present invention, a function setting device in a photographic device includes a display device to display plural function operation elements, and by changing the display or non-display of the function operation elements on the display device with a manual operation device, the display of the operation or operation inhibition state can be confirmed, and, in addition, the operability of the photographic device is greatly improved.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A function setting device for a photographic device, comprising:
    a plurality of function operation elements optionally selectively settable by a user;
    a manual operating device to select an optional function operation element from among the plurality of function operation elements;
    an exclusion device to exclude from among the selection options of the plurality of function operation elements selectively settable by the user, the function operation element selected by the manual operating device; and
    a setting control device to set a function operation element optionally selected by the user from among the plurality of function operation elements other than the function operation element excluded as a selection option.

2. A function setting device as recited in claim 1, wherein the function operation element comprises a mode relating to photography.

3. A function setting device as recited in claim 2, wherein the manual operating device comprises a dial to select a function operation element which is excluded from among the selection options of settable function operation elements according to rotation of the dial.

4. A function setting device as recited in claim 3, wherein the manual operating device comprises an erase button to initiate the exclusion from among the selection options of settable function operation elements selected by the dial in response to operation of the erase button.

5. A function setting device as recited in claim 1, wherein the function operation element comprises a numerical value indicating an operating range relating to photography.

6. A function setting device as recited in claim 1, further comprising:
    a display device to display a plurality of function operation elements,
    wherein the display displays an operation or an operation inhibition state of the function operation elements by changing to a non-display of a function operation element in response to operation of the manual operating device.

7. A function setting device as recited in claim 1, further comprising a reset device to reset the function operation element excluded by the exclusion device.

8. A function setting device as recited in claim 1, further comprising a mode setting device to set the photographic device to a mode in which an operation element can be excluded from among the selection options of the settable function operation elements.

9. A device for setting functions in a photographic device having a plurality of optionally selectively settable modes of operation corresponding to a plurality of functions, comprising:
    a display device to display the modes of operation corresponding to the plurality of functions;
    a selection device to select a mode of operation corresponding to an optional function;
    an exclusion device to exclude from among the selection options of the selectively settable plurality of modes of operation, the mode of operation selected by the selection device; and
    a setting control device to set the mode of operation selected by the user from among modes of operation other than the mode of operation which was excluded as selection option and to inhibit display of the mode selected by the selection device.

10. A device as recited in claim 9, wherein the selection device comprises an operation device to manually select a mode of operation to be excluded.

11. A device as recited in claim 9, wherein the control device controls the display device to remove the selected mode of operation from the display.

12. A device as recited in claim 9, further comprising a reset device to reset the operation and display of the excluded mode.

13. A device as recited in claim 9, further comprising a memory to store data representing each mode of operation corresponding to the plurality of functions, and to store the modes of operation most recently selected by the selection device,
    wherein the most recently selected modes of operation are set and displayed when operation of the device for setting functions commences.

14. A device as recited in claim 9, wherein the plurality of functions comprise an exposure function, a shutter speed function speed, an aperture value function, a photometry function, a rangefinding function, a windup function and a strobe function.

15. A device as recited in claim 9, wherein the mode of operation comprises a value indicating an operating range of the corresponding function.

16. A device as recited in claim 9, wherein the selection device comprises a function selection device to select a function from among the plurality of functions, and a mode of operation selection device to select a mode of operation from among a plurality of modes of operation corresponding to the selected function.

17. A device as recited in claim 16, further comprising an erasure device to manually initiate exclusion of the mode of operation selected by the selection device.

18. A device for setting functions in a photographic device having a plurality of functions, comprising:
    a display device to display plural function operation elements corresponding to the plurality of functions, the function operation elements including modes relating to photography and numerical values indicating ranges relating to photography;
    a mode setting device to set the photographic device in a mode in which operation and display of an operation element can be inhibited;

a selection device to select a function operation element, the selection device including a function selection device to select a function from among the plurality of functions and an operation element selection device to select an operation element corresponding to a selected function;

an erasure device to manually initiate inhibition of the function operation element selected by the selection device;

a control device to inhibit operation of the operation element selected by the selection device and to inhibit display of the operation element selected by the selection device in response to initiation by the erasure device; and a reset device to reset the operation element inhibited by the control device.

* * * * *